Patented Apr. 18, 1939

2,154,704

UNITED STATES PATENT OFFICE 2,154,704

METHOD OF TREATING ROSIN ESTERS AND PRODUCT THEREOF

Paul Schnorf, Wiesli, Switzerland, assignor to Hercules Powder Company, Wilmington, Del., a corporation of Delaware No Drawing. Application May 9, 1936, Serial No. 78,854

25 Claims. (Cl. 260—103)

My invention relates to a method of treating rosin esters, and to the products thereof. More particularly, it relates to a method for the polymerization of rosin esters whereby their melting points are increased, their viscosities are increased and their unsaturated characteristics decreased, and to the products thereof.

The method in accordance with my invention involves treating a rosin ester with a reagent capable of causing polymerization, as, for example, an anhydrous metallic chloride of a metal capable of forming an amphoteric hydroxide, such as, an anhydrous chloride of aluminum, tin, zinc, titanium or the like; ultra-violet light; a strong, polybasic mineral acid, such as, for example, sulfuric acid, phosphoric acid, or the like; or other operably equivalent polymerizing agent.

The polymerized rosin ester so produced may be contaminated with unpolymerized rosin ester which may, if desired, be separated from the polymerized rosin ester by a suitable method. When treating volatile rosin esters, distillation, preferably under reduced pressure, in which the unpolymerized rosin ester is distilled, leaving polymerized rosin ester as a residue, is a convenient method for such separation.

The polymerized rosin ester may, likewise, be contaminated with free rosin acid and oils, which may be present in the original ester or may be formed during the treatment with the polymerizing agent. Such free rosin acid may, if desired, be removed from the polymerized rosin ester by subjecting the polymerized rosin ester-rosin mixture to an alkaline wash, preferably while in solution in a water-immiscible solvent, followed by an aqueous wash.

The polymerized rosin ester produced in accordance with this invention is characterized by having a higher melting point, higher viscosity, a higher molecular weight, and a lower unsaturated characteristic than the rosin ester from which it was prepared. Polymerized rosin esters showing a wide variation in characteristics may be produced from any given rosin ester by the process of my invention.

The polymerized rosin ester, produced in accordance with this invention, will be found to have a viscosity characteristic which is from about 5% to about 5000% greater than the viscosity characteristic of the original rosin ester. I prefer, however, to carry out the polymerization treatment so that the viscosity characteristic of the rosin ester is increased from about 25% to about 1000%. The viscosity characteristics of the original rosin ester and of the polymerized rosin ester may be readily compared by measurements of the viscosities of their respective solutions in a suitable solvent, having identical concentrations by weight. Where both the original rosin ester and the polymerized product are liquids at normal temperatures, their respective viscosity characteristics may be measured directly without dissolving the esters in a solvent.

The polymerized rosin ester produced in accordance with this invention, will be found to have a molecular weight which is from about 5% to about 100% greater than the molecular weight of the original rosin ester. I prefer to carry out the polymerization treatment so that the molecular weight is increased from about 15% to about 75%. The molecular weights of rosin esters and polymerized rosin esters may be conveniently measured by the well known Rast method.

The unsaturated characteristic of the polymerized rosin ester produced in accordance with this invention will be from about 10% to about 80% lower than the unsaturated characteristic of the original rosin ester. Usually I find it preferable to carry out the polymerization so that the unsaturated characteristic is from about 25% to about 50% lower than that of the original rosin. The unsaturated characteristic of the original rosin ester and of the polymerized rosin ester may be measured by any method which is reliable with that particular ester. The Wijis iodine value will be found a reliable measure of the unsaturation of rosin esters and polymerized rosin esters in almost all cases, and the thiocyanate value will be found reliable with many types of esters.

The melting points of both normally liquid rosin esters and solid rosin esters will be found to be increased by the method in accordance with this invention. The melting point of the liquid rosin esters is less convenient to measure and less important than the melting point of a solid rosin ester. When such measurements are made, my polymerization treatment will be found to have substantially increased their melting points. With normally liquid rosin esters, however, increases in melting points may be noted by the physical state of the polymerized product at room temperature. Thus, the normally liquid methyl abietate may be polymerized by this method to a pasty liquid product or to a soft solid. With normally solid rosin esters, polymerization by this method will usually be found to increase the melting point from about 5° C. to about 100° C., as measured by the A. S. T. M. drop melting point method. Increases of more than 100° C. may be produced by the use of drastic conditions of treatment and long reaction periods. Ordinarily, I prefer to carry out the polymerization treatment so as to produce an increase of from about 10° C. to about 65° C. in the melting point of the rosin ester treated.

Either polyhydric alcohol or monohydric alcohol esters of rosin may be polymerized by the method in accordance with my invention. Thus, polyhydric alcohol esters of wood rosin such as, for example, ethylene glycol abietate, diethylene glycol abietate, triethylene glycol abietate, diglycol abietate, glycerol abietate, sorbitol abietate, mannitol abietate, erythritol abietate, pentaerythritol abietate, etc., may be polymerized by this method. Monohydric alcohol esters of wood rosin, such as, for example, alkyl abietates, as, methyl, ethyl, propyl, butyl, amyl, cetyl, lauryl, stearyl, etc., aromatic abietates, as, phenyl, benzyl, etc., and other abietates, as, abietyl, hydroabietyl, furfuryl, hydrofurfuryl, etc., may, likewise, be polymerized by this method. Furthermore, the analogous esters of French gum rosin, American gum rosin, and other rosins, and of the purified rosin acids, as, pimaric acid, sapinic acid, etc., may be treated by this method. Such rosin esters may be completely esterified or they may contain a small amount of unesterified rosin acid. Thus, the acid number may vary from 0 to about 25.

When the rosin ester treated in accordance with my invention is a fluid at room temperature, the polymerization agent may be added directly to the ester with agitation, or the ester may be subjected in a layer to ultra-violet light. On the other hand, and desirably in the case of esters which are substantially solid at room temperatures, the ester may be treated in solution in a suitable volatile solvent. The treatment of a solution is, in many cases, advantageous in that better contact between the polymerizing agent and the rosin ester can be secured, and the polymerization reaction can be more easily controlled. Suitable solvents are, for example, petroleum hydrocarbon solvents, as, petroleum ether, gasoline, hexane, mineral naphtha, hydrogenated petroleum fraction, etc.; monocyclic aromatic hydrocarbon solvents, as, benzol, toluol, xylol, etc.; halogenated organic solvents, as, ethylene dichloride, carbon tetrachloride, dichlorobutane, monochlorobenzol, tetrachloroethane, dichloroethyl ether, bromobenzene, iodobenzene, m-bromotoluene, fluorodichloroethane, fluorobenzene, etc.; hydrogenated aromatic solvents, as, decahydronaphthalene, cyclohexane, etc.

Where the rosin ester, treated in accordance with my invention, is polymerized by the additions of a polymerizing agent to the rosin ester per se or in form of solution, it will be found that successive treatments with fresh solutions of the polymerizing agent often will be more effective than one long treatment. Between each of such successive treatments the polymerizing agent will desirably be separated from the rosin ester or rosin ester solution.

In the practical adaptation of my invention, I may polymerize a rosin ester, either as such, or in solution in a volatile solvent, by treating it with an anhydrous metallic halide, preferably in amount within the range of about 1.0% to about 25.0% by weight, based on the rosin ester present, or more desirably within the range of about 2.0% to about 10.0% by weight, and at a temperature within the range of about 0° C. to about 150° C. The time of treatment may vary widely and will depend upon the degree of conversion desired, the conditions of treatment, etc. The time of treatment will desirably be within the range of about ¼ hour to about 8 hours. When a very high degree of polymerization is desired, a reaction period substantially longer than 8 hours may be employed. Following such polymerization treatment, the polymerizing agent is separated from the rosin ester, as by decantation or centrifuging, washed with water, or desirably, with aqueous alkali solution, if a mineral acid or a metallic halide has been used as polymerizing agent. Dilute aqueous solutions of alkaline compounds, such as sodium hydroxide, potassium hydroxide, ammonium hydroxide, sodium carbonate, ammonium carbonate, etc., or aqueous solutions of organic bases, such as triethanolamine, aniline, pyridine, etc., are suitable for this purpose. If the rosin ester has been treated in the form of a solution in a volatile solvent, the polymerized rosin ester may be recovered from the solution by the evaporation of the volatile solvent. Such evaporation may, if desired, be carried out under reduced pressure. If the polymerized rosin ester is of a sufficiently volatile nature, it may be further purified by distillation under reduced pressure. Thus, unpolymerized rosin ester when of a volatile nature, may be distilled in vacuo, leaving the polymerized rosin ester as a residue.

During the polymerization of a rosin ester solution with a metallic halide, a precipitate of an association product of the metallic halide and polymerized rosin ester may appear in the reaction mixture. When such a precipitate appears it may be treated in much the same way as the similar precipitate which may appear during the polymerization with a polybasic mineral acid, described in detail hereinafter.

In following the embodiment of my invention in which a metallic halide is used as a polymerizing agent, it will often be found that traces of the metal of the metallic halide used, remain in the polymerized product. When used for certain purposes such traces of metal in the product may not be undesirable. For certain other purposes, however, all such traces of metal must be removed from the product. This may be readily accomplished by washing the polymerized rosin ester dissolved in a suitable water-immiscible solvent with an aqueous solution of a mineral acid, such as, for example, sulfuric acid, hydrochloric acid, etc. This may be conveniently done immediately following the removal of the metallic halide from the rosin ester solution at the end of the polymerization treatment or following a water washing of this solution. The concentration of the aqueous acid solution may vary from very dilute to a concentration of about 15%. Following such an acid wash, it is usually desirable to wash the solution with water, or with an aqueous alkali solution followed by a water wash.

In following the various embodiments of my invention in which it is desirable to wash solutions of polymerized rosin with water, the mixture of polymerized rosin solution and water may have a tendency to emulsify. Such a tendency toward emulsification may be avoided by the use of an aqueous solution of an electrolyte, such as, for example, alkali metal and alkaline earth halides, alkali borates, phosphates, etc.

As a specific illustration of the embodiment of my invention by which I polymerize a rosin ester by treatment with an anhydrous metallic chloride, I may cite the procedures given in the following examples:

EXAMPLE I

Fifteen cc. of stannic chloride is added, with agitation, to 1500 grams of ethyl abietate, at a temperature within about the range of 20° C.–27° C. The mixture is then agitated for about 15 hours at a temperature of about 90° C., after which as much of the stannic chloride as possible is separated, for example, by decantation. The product is then desirably dissolved in a suitable solvent, as ether, benzene, etc., and washed with aqueous sodium carbonate, say a 5% solution of sodium carbonate. After washing, the ether or other suitable solvent used, is distilled off and unaltered abietate is then distilled off under reduced pressure up to a bath temperature of say about 280° C. A pressure of about 5 mm. may be used. The residue will amount to about 355 grams, will be fairly light in color and have an acid number of about 1.5. A similar procedure, omitting, however, the alkali wash, will give a somewhat higher yield of a somewhat darker material having an acid number of about 25.

EXAMPLE II

Five cc. of fuming stannic chloride are added slowly with agitation, to 100 grams of ester gum (glycerol ester of wood rosin) dissolved in 400 cc. of toluene. Agitation is continued at about 75° C. for three hours. The solution is then washed with water, and finally is washed with 5% aqueous sodium carbonate solution. The toluene is then evaporated leaving about 98 parts of partially polymerized ester gum melting at 134° C., as compared to 84° C. for the original glycerol abietate.

EXAMPLE III

To a solution of 100 g. ester gum (glycerol ester of wood rosin) dissolved in 400 g. toluol were added 5 cc. of anhydrous stannic chloride. The mixture was agitated three hours at about 75° C. After cooling, the mixture was water washed and the solvent removed by distillation at reduced pressure. The analyses of the product of this treatment, and that of the original ester gum were as follows:

|  | Original ester gum | Treated ester gum |
| --- | --- | --- |
| Acid number | 7.4 | 1 |
| Melting point (drop method) | 104° C. | 118.5° C. |
| Iodine No. | 254 | 199 |
| Molecular weight | 711 | 864 |

EXAMPLE IV

To a solution of 100 g. of ester gum (glycerol ester of wood rosin) dissolved in 200 g. of ethylene dichloride, was added 40 g. of aluminum chloride at 50° C., with agitation. The mixture was maintained at a temperature just below the reflux temperature of the mixture for a period of about 4 hours, with intermittent agitation. The reaction mixture was then cooled and poured into 2.5 liters of a 2% aqueous solution of hydrochloric acid, with agitation. Additional aqueous hydrochloric acid was added to bring the total hydrochloric acid to 50–60 g. of HCl (calculated as 100% strength) and then steam distilled to remove the ethylene dichloride. The solid residue was then extracted with benzene, and the solution so formed washed with hot aqueous 5% hydrochloric acid solution, and then with water until neutral. The product was then recovered from the benzene solution, by evaporating the benzene under reduced pressure. The analyses of the product of this treatment, and that of the original ester gum were as follows:

|  | Original ester gum | Treated ester gum |
| --- | --- | --- |
| Acid number | 6 | 3 |
| Melting point (drop method) °C | 106 | 121 |

By an alternative embodiment of my invention, I may polymerize a rosin ester by subjecting it, as such or in the form of a viscous solution in a suitable solvent, to the action of ultra-violet light. The rosin ester will desirably be spread into a layer of a thickness within about the range of 1 mm.–50 mm. and be subjected to the light at a distance of within the range of 5 cm.–100 cm. from the source of light, which may be, for example, a Cooper-Hewitt quartz tube mercury ultra-violet light. Such treatment will preferably be carried out in an inert atmosphere or in a vacuum, to avoid oxidation of the ester. The time of such treatment may vary widely and will depend on the degree of conversion desired, the strength of the light source, etc. However, the time of treatment will usually fall within about the range of 5–150 hours.

As a specific illustration of this embodiment of my invention, I may cite the following procedure for the polymerization of ethyl abietate by exposure to ultra-violet light:

EXAMPLE V

A layer of ethylabietate, say about 10 mm. in thickness, is subjected to ultra-violet light from a suitable source, as, for example a Cooper-Hewitt quartz tube mercury ultra-violet light, at a distance of about 50 cm. from the source, for about 50 hours. The product will be somewhat solid, and only slightly darker in color than the original abietate.

By an alternative embodiment of my invention, I may polymerize a rosin ester by subjecting it, preferably in the form of a solution in a suitable solvent, to the action of a strong, polybasic mineral acid, such as, for example, sulfuric acid, phosphoric acid, or the like. I prefer to use sulfuric acid, due to its strong polymerizing action. The concentration of rosin ester in the solution will desirably be within the range of about 10% to about 75%. The concentration of the acid used will desirably be within the range of about 60% to about 101% and in amount within the range of about 1.0% to about 100%, and preferably within the range of about 10% to about 50%, on the basis of the rosin ester treated. When using sulfuric acid as a polymerizing agent, the temperature of the reaction mixture will desirably be maintained within the range of about −10° C. to about 100° C., and preferably within the range of about 10° C. to about 50° C. When using phosphoric acid as a polymerizing agent, the temperature will desirably be maintained within the range of about 35° C. to about 150° C. It will be found that phosphoric acid is a less active polymerizing agent for rosin esters than sulfuric acid. The reaction period may vary from the time required to bring the acid into intimate contact with the rosin ester to about eight hours or more, depending upon the degree of conversion desired and the other conditions of the reaction. During the period of contact between the rosin ester and the acid, the mixture is subjected to vigorous agitation.

During the treatment of the rosin ester with the acid polymerizing agent, a precipitate may appear in the reaction mixture, depending upon the particular solvent in which the rosin ester is dissolved. This precipitate, when it appears, is an acid-polymerized rosin ester association product of complex nature, and usually carries with it color bodies of the original rosin ester and color bodies which may be formed by the action of the acid on the rosin ester. I have found that such a precipitate will often appear when the solvent used in the original rosin ester solution is a petroleum hydrocarbon solvent, a monocyclic aromatic hydrocarbon solvent, decahydronaphthalene, or certain chlorinated solvents, as, monochlorobenzol, carbon tetrachloride, or dichlorobutane. Usually no precipitate will appear when using certain other chlorinated solvents as tetrachloroethane, dichloroethyl ether, or ethylene dichloride. When such a precipitate appears, it is a polymerized rosin ester-sulfuric acid association product and may be separated from the reaction mixture at the end of the polymerization treatment to secure an improvement in the color of the product, with some sacrifice in the increase in melting point obtained. Such separation may be readily accomplished by centrifuging or by allowing the precipitate to settle and separating the rosin ester solution therefrom. Alternately, a controlled amount of water may be added to the reaction mixture to decompose a portion of the precipitate, and cause a part of the polymerized rosin ester contained therein to redissolve, and the remainder separated by decantation. Again, an excess of water may be added to completely decompose the precipitate and cause all the rosin esters contained therein to redissolve.

Where decantation procedure is used, the polymerized rosin solution may, if desired, be treated with absorbents, such as, for example, activated carbon, fuller's earth, fibrous asbestos, etc., directly following decantation, to remove any sludge which has not been removed by decantation. Such treatment often produces substantial improvement in the color of the final product.

Following the polymerization treatment and removal of the precipitate, if such is removed, the reaction mixture is washed with hot or cold water, or hot or cold solutions of salts, as, alkali metal salts of chlorides, sulfates, phosphates, borates, etc., or dilute solutions of alkaline materials, until entirely free of acid. Any precipitate which may be present at this stage of the procedure is redissolved in the rosin ester solution. The polymerized rosin ester is then recovered from the solution by the evaporation of the solvent.

In following the procedure in which an acid sludge is separated from the rosin solution, the separated sludge may, if desired, be extracted with a suitable solvent for the precipitated material contained therein, the solution formed thereby washed free of acid with water, aqueous salt solutions, or dilute aqueous alkali solutions, and a dark colored, highly polymerized rosin ester recovered therefrom by the evaporation of the solvent. Suitable solvents for the precipitated material are halogenated hydrocarbons, such as, for example, ethylene dichloride, carbon tetrachloride, chlorobenzene, etc.; ethers, such as, for example, diethyl ether, isopropyl ether, dichloroethyl ether, etc.; aromatic hydrocarbons, such as, for example, benzol, toluol, xylol, alkylated benzols, etc.

As specific illustrations of this embodiment of my invention, I may cite the following examples of the polymerization of rosin esters.

EXAMPLE VI

About 300 parts by weight of technical methyl abietate (the methyl ester of purified wood rosin) were dissolved in 500 parts by weight of benzol and treated with 100 parts by weight of concentrated (95%) sulfuric acid with agitation, within a period of 20 minutes, at a temperature of 15–20° C. Agitation of this mixture was continued at the same temperature for 1.25 hours. The sludge of acid and precipitated material was then allowed to settle, and the benzol solution separated from it by decantation. The benzol solution was washed with water until free of acid, and polymerized methyl abietate recovered therefrom by evaporation of the benzol. The sludge containing the precipitated material was then extracted with ether. The ether extract was washed with water until free of sulfuric acid, and a dark, highly polymerized methyl abietate recovered therefrom by evaporation of the ether. The properties of the polymerized methyl abietates obtained from the benzol and ether solution was as follows:

|  | Original methyl abietate | Benzol fraction | Ether fraction |
| --- | --- | --- | --- |
| Color (U. S. standard rosin types) |  | About M and somewhat lighter than the original. | About F. |
| Viscosity | 2.6 centipoises in 50 percent xylene solution. | 3.3 centipoises in 50 percent xylene solution. | A solid melting at 50° C. indicating a high degree of polymerization. |
| Iodine No. | 240 | 158 |  |
| Thiocyanate value | 80 | 32 |  |
| Molecular weight | 260 | 295 | 390. |

EXAMPLE VII

About 300 parts by weight of a glycerol ester of rosin (ester gum) were dissolved in 500 parts by weight of benzol and treated with 100 parts by weight of concentrated sulfuric acid (95% by weight) with agitation, within a period of 20 minutes, at a temperature of 15–20° C. Agitation of this mixture was continued at the same temperature for a period of 1.25 hours. The sludge of acid and material which had precipitated was then allowed to settle, and the benzol solution separated from it by decantation. The benzol solution was then washed with water until free of sulfuric acid and polymerized glycerol ester of rosin recovered therefrom by evaporation of the benzol. The sludge containing the precipitated material was then extracted with ether, the extract washed with water until free of sulfuric acid, and the solvent evaporated. The properties of the original glycerol ester of rosin, of the polymerized glycerol ester of rosin obtained from the benzol solution and that obtained from the ether solution follow:

|  | Original glycerol ester of rosin | Poly. glycerol ester from benzol | Poly. glycerol ester from ethers |
|---|---|---|---|
| Melting point (drop method) | 93° C. | 116.5° C. | 145° C. |
| Acid number | 6.5 |  |  |
| Color (U. S. standard rosin types) | I+ | H | F+ |
| Iodine number | 254 | 202 |  |
| Viscosity in 50% xylene solution at 25° C. | 8.0 centipoises | 11.0 centipoises | 36.5 centipoises |
| Molecular weight | 630 | 710 | 850 |

A comparison of these properties shows that the acid treatment made quite substantial increases in the melting points of the two polymerized products.

Illustration of the practical embodiment of my invention in which a rosin ester is polymerized by treatment with sulfuric acid with no removal of a precipitate, is given in the following examples:

EXAMPLE VIII

About 60 g. of a 30% solution of ester gum in benzene was treated during 10 minutes with 45 g. of 95% strength sulfuric acid with agitation at a temperature of about 50° C. The mixture was agitated for 1¼ hour at 18° C. About 500 cc. water were added to the reaction mixture during a 10 minute period, keeping the temperature the same. The reaction mixture was water washed until substantially neutral and the solvent removed by reduced pressure distillation.

|  | Original | Treated |
|---|---|---|
| Acid number | 6 | 5 |
| Melting point | 106° C. | 142° C. |

EXAMPLE IX

About 33 g. of 95% strength sulfuric acid were added to 830 g. of a solution containing 15% by weight ester gum in ethylene dichloride during a 7 minute period. The temperature was 15° C. with agitation. The reaction mixture was agitated 1¼ hours at 15° C., and then poured into warm water, the dilute acid removed and the solution washed until neutral. To eliminate decomposition of halogenated solvent, it was removed by means of steam distillation. The residue was dissolved in benzol and the solvent then removed by reduced pressure distillation.

|  | Original | Treated |
|---|---|---|
| Acid number | 6 | 5 |
| Melting point | 105° C. | 156° C. |
| Iodine value | 254 | 204 |
| Molecular weight | 630 | 950 |

A duplication of the procedure given in Example IX, using a 30% solution of ester gum, and a proportionately larger amount of 95% sulfuric acid gave such a marked increase in the viscosity of the reaction mixture, that satisfactory agitation could not be obtained. This marked increase in the viscosity of the reaction mixture indicated a high degree of polymerization of the ester gum contained therein.

The example which follows illustrates a practical embodiment of this invention for the polymerization of methyl abietate by treatment with phosphoric acid:

EXAMPLE X

To a solution of 200 g. technical methyl abietate (A. N. −2) in 200 g. toluene were added 70 g. of 100% H₃PO₄. The mixture was agitated 5 hours at 115–16° C., cooled, water washed until free from catalyst and the solvent removed.

|  | Original | Treated |
|---|---|---|
|  | Centipoises | Centipoises |
| Viscosity (25° C.) | 2501 | 3000 |

The products embodying my invention are useful for the production of protective coating compositions, such as, varnishes, lacquers and the like, and will be found to give protective coatings of greater durability, and in some cases greater resistance to discoloration by ultra-violet light, than the corresponding unpolymerized rosin esters.

A lacquer type protective coating will include, in addition to a polymerized ester of rosin, a film forming material, such as, for example, nitrocellulose, cellulose acetate, cellulose aceto-butyrate, ethyl cellulose, chorinated rubber, or the like, and a suitable volatile solvent or solvent mixture. Such protective coatings also contain softeners or plasticizers such as, for example, castor oil, dibutyl phthalate, triphenyl phosphate, tributyl phosphate, monohydric alcohol esters of hydrogenated rosin, etc.; pigments; and other formulating materials as may be desired.

Lacquer type protective coatings may, for example, be prepared, for example, by the formulas given in parts by weight in Table I.

TABLE I

| Formula | A | B | C |
|---|---|---|---|
| Polymerized rosin ester | 6 | 8 | 10 |
| Nitrocellulose (R. S. ½ sec. type) | 10 | 10 | 10 |
| Dibutyl phthalate | 4 | 4 | 4 |
| Ethyl alcohol | 5.0 |  |  |
| Butyl alcohol | 5.0 |  |  |
| Ethyl acetate | 5.0 | 80 | 80 |
| Toluol | 44.2 |  |  |
| Butyl acetate | 21.0 |  |  |

An an illustration of the improved durability of lacquer type protective coatings containing polymerized rosin esters, as compared with similar coatings containing unpolymerized rosin esters, I may cite data secured by out-door exposure tests of steel panels coated with compositions in which polymerized glycerol esters of I wood rosin (polymerized ester gums) and an unpolymerized glycerol ester of I wood rosin (ester gum) were used as the "polymerized rosin ester" in the formulas of Table I. The characteristics of the resins tested in the formulas of Table I and the data secured by the exposure tests are given in Table II.

TABLE II

| Resin used in lacquer | Characteristics of rosin used | | |
|---|---|---|---|
|  | Melting point (drop method) | Acid number | Color U. S. standard |
|  | °C. |  |  |
| I rosin ester gum | 88.0 | 9.5 | 36 amber. |
| Polymerized ester gum (1) | 113.5 | 13.5 | 60 amber. |
| Polymerized ester gum (2) | 119.0 | 9.5 | 80 amber+45 red. |
| Polymerized ester gum (3) | 110.5 | 8.0 | 80 amber. |
| Polymerized ester gum (4) | 108.5 | 9.0 | 18 amber. |
| Polymerized ester gum (5) | 120.5 | 13.0 | 80 amber+4.0 red. |

TABLE III

| Resin used in lacquer | Fence life in days | | | Relative rating of durability |
|---|---|---|---|---|
| | A | B | C | |
| I rosin ester gum | 14 | 10 | 10 | 1.0 |
| Polymerized ester gum (1) | 20 | 14 | 10 | 1.3 |
| Polymerized ester gum (2) | 21 | 14 | 10 | 1.3 |
| Polymerized ester gum (3) | 21 | 14 | 10 | 1.3 |
| Polymerized ester gum (4) | 17 | 14 | 10 | 1.2 |
| Polymerized ester gum (5) | 20 | 20 | 20 | 1.8 |

In Table II it will be observed that each of the polymerized rosin esters showed up substantially better than the unpolymerized rosin ester in the relative rating, in which the larger figures mean higher durability.

A varnish type protective coating will include, in addition to a polymerized ester of rosin, a drying oil, or a combination of drying oils, or a combination of semi-drying oils, or combinations of drying and semi-drying oils, a drier and a volatile thinner, and will be prepared by heating a mixture of the polymerized rosin ester and drying oil together, thinning with a volatile solvent and then adding the drier. Suitable drying oils for use in such varnish compositions are, for example, linseed oil, tung oil, perilla oil, oiticica oil, etc. Suitable thinning solvents are, for example, turpentine, benzol, toluol, xylol, the commercial xylol mixture known as Hi-flash naphtha, petroleum hydrocarbon mixtures, such as those known to the trade as V. M. and P. naphtha, Varsol, etc. Suitable drying agents are metal salts, such as, zinc, cobalt, lead, manganese resinates, naphthenates, linoleates, and acetates. Semi-drying oils, such as, for example, soya bean oil, fish oil, etc., may be added to the composition in amounts insufficient to cause undesirable tackiness of the dried varnish film. Enamel compositions may be prepared by grinding suitable pigments into the thinned polymerized rosin ester varnish, either before or after addition of the drier.

Illustrations of varnish formulations containing polymerized glycerol ester of I wood rosin (polymerized ester gum) with different proportions of drying oil (different oil lengths) are given in Table IV, in parts by weight.

TABLE IV

| Oil length | 10 gallon | 25 gallon | 40 gallon |
|---|---|---|---|
| Polymerized ester gum | 50 | 50 | 50 |
| Tung oil (treated) | 38.75 | 85.8 | 136.5 |
| Linseed oil (heat bodied) | | 12.0 | 20. |
| 6% cobalt napthenate drier | .33 | | 0.8 |
| 24% lead napthenate drier | .33 | | 1.3 |
| Lead acetate | | 0.8 | |
| Cobalt acetate | | 0.07 | |
| Petroleum hydrocarbon thinner (Varsol) | 85 | 147.8 | 156.0 |
| Wood turpentine | | | 50.0 |

The preparation of varnishes having the formulations given in the above table may be carried out as follows:

*Ten gallon varnish*

Run a mixture of the polymerized rosin ester and treated tung oil to 500° F., cool to 425° F., thin with the Varsol and add the driers. This product is a 10 gallon varnish.

*Twenty-five gallon varnish*

Run a mixture of the polymerized rosin ester and the treated tung oil to 565° F., add the heat-bodied linseed oil to the mixture to chill it, allow the temperature to drop to 510° F. and then hold the temperature at this point until the mixture will give a 24–30 inch string-off of a cold glass rod, allow to cool, thin with Varsol and add the driers. This product is at 25 gallon varnish.

*Forty gallon varnish*

Run a mixture of the polymerized rosin ester and the treated tung oil to 565° F., chill the mixture by the addition of the heat-bodied linseed oil, allow the temperature of the mixture to drop to 510° F. and then hold the temperature at this point until the mixture will give a 24–30 inch string-off of a cold glass rod, thin the mixture with Varsol and turpentine and add the driers. This product is a 40 gallon varnish.

It will be understood that the details and examples given hereinbefore are illustrative only, and in no way limiting on my invention as broadly described hereinbefore and in the appended claims.

In the appended claims, where the term "unsaturated characteristic" is used I mean the unsaturated characteristic as measured by the thiocyanate method or the Wijis iodine method, depending on which gives the most reliable measure of the unsaturation of the particular ester considered.

This application is a continuation in part of my application for United States Letters Patent, Serial No. 474,316, filed August 9, 1930.

What I claim and desire to protect by Letters Patent is:

1. A polymerized rosin ester characterized by having a higher viscosity characteristic, a melting point from about 5° C. to about 100° C. higher, and a molecular weight which is about 5% to about 100% greater, than the corresponding unpolymerized rosin ester.

2. A polymerized ester of rosin characterized by having a melting point from about 5° C. to about 100° C. higher, a molecular weight from about 5% to about 100% greater, and an unsaturated characteristic from about 10% to about 80% lower, than the corresponding unpolymerized rosin ester.

3. The method for the polymerization of a rosin ester which includes contacting a rosin ester with a polymerizing agent selected from the group consisting of ultra-violet light, strong polybasic mineral acids and anhydrous metallic chlorides of metals capable of forming amphoteric hydroxides for a period of time sufficient to produce substantial polymerization of the rosin ester and separating the polymerized rosin ester so produced from the said polymerizing agent.

4. The method for the polymerization of a rosin ester which includes contacting a rosin ester with a polymerizing agent selected from the group consisting of ultra-violet light, strong polybasic mineral acids and anhydrous metallic chlorides of metals capable of forming amphoteric hydroxides, for a period of time sufficient to make a substantial increase in the molecular weight of the rosin ester by polymerization thereof and separating the polymerized rosin ester so produced from the said polymerizing agent.

5. The method for the polymerization of a rosin ester which includes contacting a solution of a rosin ester in a volatile solvent with a polymerizing agent selected from the group consisting of ultra-violet light, strong polybasic mineral acids and anhydrous metallic chlorides of metals capable of forming amphoteric hydroxides, and recovering a polymerized rosin ester from the solution by the evaporation of the volatile solvent.

6. The method for the polymerization of a rosin ester which includes contacting a solution of a rosin ester with a polymerizing agent selected from the group consisting of ultra-violet light, strong polybasic mineral acids and anhydrous metallic chlorides of metals capable of forming amphoteric hydroxides, and washing the polymerized rosin ester so formed with an alkaline aqueous solution.

7. The method for the polymerization of rosin esters which includes contacting a solution of a rosin ester in a volatile solvent with a strong polybasic mineral acid, separating the acid from the solution, washing the solution with water and recovering a polymerized rosin ester therefrom by evaporating the volatile solvent.

8. The method of converting a rosin ester into a product of higher melting point by the polymerization thereof which includes heating a rosin ester with from about 1.0% to about 25% of its weight of an anhydrous chloride of a metal capable of forming an amphoteric hydroxide, the heating being at such a temperature and for such a time as to produce a substantial increase in the melting point of the rosin ester by the polymerization thereof and separating the polymerized rosin ester from the said metallic chloride.

9. The method of converting a rosin ester into a product of higher melting point by the polymerization thereof which includes heating a rosin ester with from about 2.0 to about 10% of its weight of anhydrous stannic chloride, the heating being at such a temperature and for such a time as to produce a substantial increase in the melting point of the rosin ester by the polymerization thereof and separating the polymerized rosin ester from the said stannic chloride.

10. The method of converting a rosin ester into a product of higher melting point by the polymerization thereof which includes heating a rosin ester with from about 2.0% to about 10% of its weight of anhydrous zinc chloride, the heating being at such a temperature and for such a time as to produce a substantial increase in the melting point of the rosin ester by the polymerization thereof and separating the polymerized rosin ester from the said zinc chloride.

11. The method of converting a rosin ester into a product of higher melting point by the polymerization thereof which includes heating a rosin ester in solution in a solvent with from about 2.0% to about 10% of its weight of an anhydrous chloride of a metal capable of forming an amphoteric hydroxide the heating being at such a temperature and for such a time as to produce a substantial increase in the melting point of the rosin ester by the polymerization thereof and separating the polymerized rosin ester from the said metallic chloride.

12. The method of converting an abietic acid ester into a product of higher melting point by the polymerization thereof which includes heating an abietic acid ester with from about 2.0% to about 10% of its weight of an anhydrous chloride of a metal capable of forming an amphoteric hydroxide, the heating being at such a temperature and for such a time as to produce a substantial increase in the melting point of the abietic acid ester by the polymerization thereof and separating the polymerized abietic acid ester from the said metallic chloride.

13. The method of converting a rosin ester into a product of higher melting point by the polymerization thereof which includes heating a rosin ester with an anhydrous chloride of a metal capable of forming an amphoteric hydroxide, the heating being at such a temperature and for such a time as to produce a substantial increase in the melting point of the rosin ester by the polymerization thereof and separating the polymerized rosin ester from the said metallic chloride.

14. A polymerized ester of rosin characterized by a melting point from about 5° C. to about 100° C. higher than the corresponding unpolymerized rosin ester.

15. A polymerized ester of rosin characterized by a melting point from about 10° C. to about 65° C. higher than the corresponding unpolymerized rosin ester.

16. A polymerized ester of rosin characterized by a viscosity characteristic from about 5% to about 5000% higher than the viscosity characteristic of the corresponding unpolymerized rosin ester.

17. A polymerized ester of rosin characterized by a viscosity characteristic of from about 25% to about 1000% higher than the viscosity characteristic of the corresponding unpolymerized rosin ester.

18. A polymerized polyhydric alcohol ester of rosin characterized by a melting point of from about 5° C. to about 100° C. higher than the corresponding unpolymerized polyhydric alcohol ester of rosin.

19. A polymerized monohydric alcohol ester of rosin characterized by a melting point of from about 5° C. to about 100° C. higher than the corresponding unpolymerized monohydric alcohol ester of rosin.

20. A polymerized glycerol ester of rosin characterized by a melting point of from about 5° C. to about 100° C. higher than the corresponding unpolymerized glycerol ester of rosin.

21. A polymerized methyl ester of rosin characterized by a melting point of from about 5° C. to about 100° C. higher than the corresponding unpolymerized methyl ester of rosin.

22. The method for the polymerization of rosin esters which includes contacting a solution of a rosin ester in a volatile solvent with sulfuric acid, separating the sulfuric acid from the solution and recovering a polymerized rosin ester therefrom by evaporating the volatile solvent.

23. The method for the polymerization of rosin esters which includes contacting a solution of a rosin ester in a volatile solvent with concentrated sulfuric acid, separating the concentrated sulfuric acid from the solution and recovering a polymerized rosin ester therefrom by evaporating the volatile solvent.

24. The method for the polymerization of rosin esters which includes contacting a solution of a rosin ester in a volatile solvent with sulfuric acid having a concentration within the range of about 65% to about 101% by weight, separating the sulfuric acid from the solution and recovering a polymerized rosin ester therefrom by evaporating the volatile solvent.

25. The method for the polymerization of a rosin ester which includes contacting a solution of a rosin ester in a volatile solvent with concentrated sulfuric acid, separating the sulfuric acid from the solution, washing the ester solution with an aqueous alkaline solution, and then recovering a polymerized rosin ester from the solution thereof by evaporating the volatile solvent.

PAUL SCHNORF.